United States Patent [19]

Heinzen

[11] Patent Number: 4,625,662

[45] Date of Patent: Dec. 2, 1986

[54] TOWABLE TRANSPLANTER

[76] Inventor: Ralph Heinzen, P.O. Box 728, Garrison, N. Dak. 58540

[21] Appl. No.: 675,980

[22] Filed: Nov. 29, 1984

[51] Int. Cl.⁴ .............................................. A01C 11/00
[52] U.S. Cl. .......................................... 111/2; 37/2 R
[58] Field of Search .................... 47/76; 111/2,4; 37/2

[56] References Cited

U.S. PATENT DOCUMENTS

| 1,559,841 | 7/1925 | Sager | 37/2 R |
| 2,313,604 | 4/1941 | Vogel | 37/2 R |
| 2,729,493 | 1/1956 | Engel | 111/4 X |
| 2,769,278 | 11/1956 | Wassell et al. | 47/76 X |
| 3,017,707 | 1/1960 | Sigler et al. | 37/2 R |
| 3,017,709 | 6/1959 | Sigler | 37/2 R |
| 3,284,932 | 11/1966 | Wendlandt | 37/2 R |
| 3,364,601 | 1/1966 | Korenek | 37/2 R |
| 3,460,277 | 12/1965 | Grover et al. | 37/2 R |
| 3,618,234 | 3/1969 | Bates | 37/2 R |
| 3,989,075 | 11/1976 | Coughran | 37/2 R |
| 4,067,369 | 1/1978 | Harmon | 37/2 R |
| 4,341,025 | 7/1982 | Stocker | 37/2 R |
| 4,539,920 | 9/1985 | DuFrene | 111/2 |

FOREIGN PATENT DOCUMENTS

| 2427449 | 1/1975 | Fed. Rep. of Germany | 37/2 R |
| 2902597 | 7/1980 | Fed. Rep. of Germany | 37/2 R |

Primary Examiner—James R. Feyrer
Attorney, Agent, or Firm—Merchant, Gould, Smith, Edell, Welter & Schmidt

[57] ABSTRACT

The present invention relates to a towable transplanter for larger plants, bushes and trees. The transplanter has a two-piece pivotally attached frame (20), a pair of wheels (15), an extractor head (40), including a plurality of blades 41 reciprocally mounted in a support ring and a manually-operated hydraulic system (60). The hydraulic system raises and lowers the second frame member (31) and extractor head (40) of the transplanter (10). The extractor head (40) can be set at various heights above the ground surrounding the plant to be extracted, thereby allowing extraction of various size rootballs.

13 Claims, 7 Drawing Figures

TOWABLE TRANSPLANTER

TECHNICAL FIELD

The present invention relates to a self-contained towable transplanter. More particularly, the present invention relates to a transplanter having a two-piece frame, a pair of wheels, an extractor head and a manually-operated hydraulic system which acts upon the frame and extractor head.

BACKGROUND OF THE INVENTION

Currently, there are many commercially available transplanting devices on the market. Available transplanters range in size from small, manually-operated transplanters to large transplanters carried by tractors of trucks for use in connection with moving trees, large bushes, and other plants requiring a mass of earth of such size that vehicular transportation thereof is necessry.

In transplanting larger plants, such as trees, it is important to excavate at least a portion of the roots together with the earth in which the roots are located. Plants that are transplanted with the least damage to their rootlets and roothairs have the best chance of surviving in a new location, all other things being equal. A plant is desirably moved along with a "rootball," i.e., with at least a portion of its roots still embedded in the earth in which the plant was growing. This allows the roots and the rootball to continue to nourish the plant after it is transplanted until new root growth can take place.

Any relative movement between the earth and the roots in the rootball, however, tends to break off or damage the rootlets or tiny root hairs. Therefore, it is important for a transplanting device to sever a rootball from the ground with a minimum of disturbance to the earth and roots therein.

Many of the existing transplanters used to excavate and transport larger plants employ hydraulic systems which are mounted on or form a part of the transporting vehicle. Equiping a truck or tractor with a permanent hydraulic system designed specifically for tree transplanting significantly limits the use of the vehicle.

A number of the available transplanters used to move larger plants include ground piercing blades that are driven into the ground around the plant to ensure that the rootball is completely severed from the ground. In some cases, a separate hydraulic system is used to provide the force to drive the blades into and out of the ground.

The present invention provides a manually-operated towable transplanter having a self-contained hydraulic system which is capable of removing and transplanting plants such as small trees and bushes together with the proper size rootball.

SUMMARY OF THE INVENTION

The present invention relates to a self-contained towable transplanter. More particularly, the transplanter has a two-piece frame which is supported on a pair of wheels, an extractor head and a hydraulic system. The two-piece frame has a first member which is supported on the wheels and includes a mechanism for attaching the transplanter to a towing vehicle. The frame also includes a second member which is pivotally supported with respect to the first member and includes an extractor head. The extractor head has a plurality of blades reciprocally mounted in a support ring. The support ring has two portions, one portion being directly attached to the second frame member and a second portion which is hingedly mounted to the first portion and which serves as a gate through which a tree may pass. The hydraulic system of the transplanter acts between the first and second frame members to pivotally drive the second frame member with respect to the first frame member. The hydraulic system also raises and lowers the extractor head with respect to the second frame member.

The present invention is particularly advantageous in that it is totally self-contained. Unlike many smaller self-contained transplanters, the present invention is capable of excavating and transplanting larger trees or bushes than a person can manually handle. An advantage of the present invention is that it is versatile and can be used with any of various transporting vehicles, including trucks and tractors of various sizes by attaching the device to the towing hitch. Additionally, the extractor head of the present invention can be set at various heights above ground level, thereby providing control over the size of the rootball to be removed with each plant.

The present invention includes a manually operated hydraulic system which is located entirely on the transplanter unit itself. This allows the transplanter to be easily separated from the transporting vehicle when not in use or when a substitute vehicle is needed. Additionally, since the transplanter is detachable from the transporting vehicle, it can be easily moved between work sites.

Another advantage of the present invention is the design of the extractor head blades. Unlike some available transplanters which rely on a hydraulic system to drive extractor blades into the ground around the plant, the present invention provides for manual driving of the blades with a rod driver. Eliminating the need for hydraulically driven extractor blades greatly simplifies the structure of the transplanter and reduces the potential maintenance problems associated with hydraulically driven blades.

These and other advantages and features of novelty which characterize the invention are pointed out with particularity in the claims annexed hereto and forming a part thereof. However, for a better understanding of the invention, its advantages, and objects attained by its use, reference should be had to the drawings which form a further part hereof, and to the accompanying descriptive matter, in which there is illustrated and described a preferred embodiment of the invention.

BRIEF DESCRIPTION OF THE DRAWINGS

In the drawings, like reference numerals indicate corresponding parts throughout the several views.

FIG. 3 is a top plan view of the transplanter with the hinged gate of the extractor head opened;

DETAILED DESCRIPTION

Referring now to the drawings, there is shown in FIGS. 1 through 7 a transplanter 10 of the present invention, including a frame 20, extractor head 40, a hydraulic system 60 and a pair of wheels 15.

The frame 20 (FIGS. 1-3) may be of two-piece construction having a first frame member 21 and a second frame member 31. The first frame member 21 is mounted on and between the wheels 15 and includes a hitch structure 22 for attaching the transplanter 10 to a towing vehicle 90. The hitch 22 for attaching the transplanter 10 to the towing vehicle 90 may be a common ball and socket type trailer hitch. The type and size of towing vehicles 90 used to move plants extracted by the transplanter 10 can be varied depending on the project undertaken. In many cases an automobile small, conventional truck or small garden tractor may be used.

Figure 1:
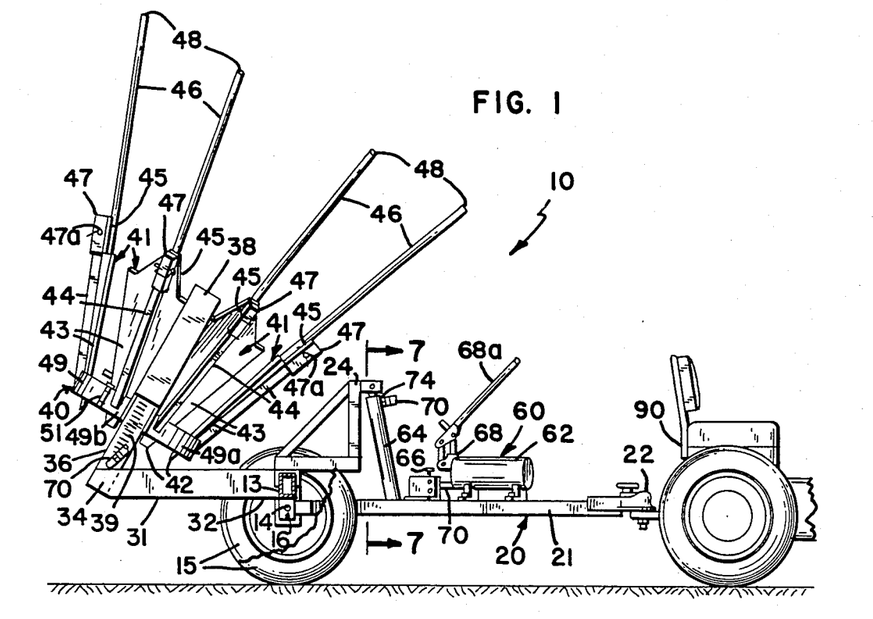
FIG. 1 is a side elevational view of the transplanter.
Figure 2:
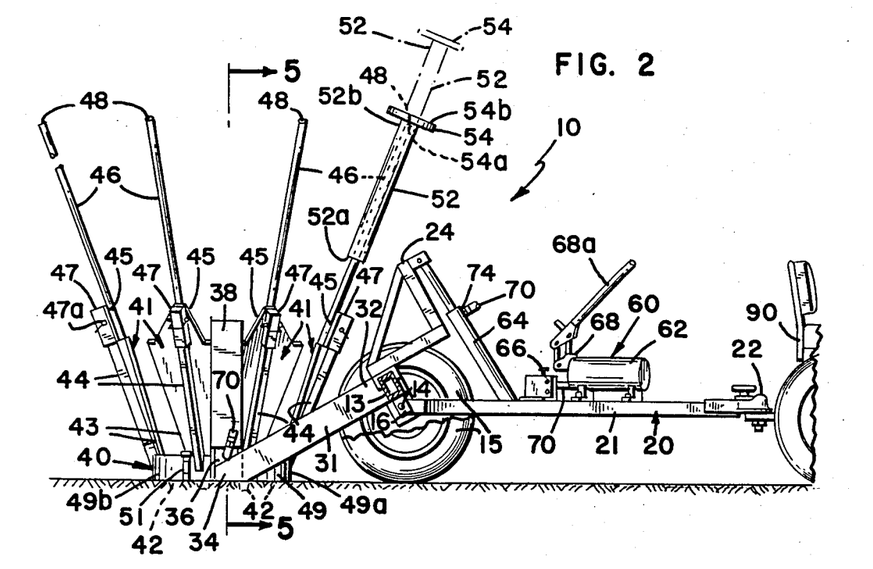
FIG. 2 is a side elevational view of the transplanter with the second frame portion and extractor head lowered.
Figures 3, 7:
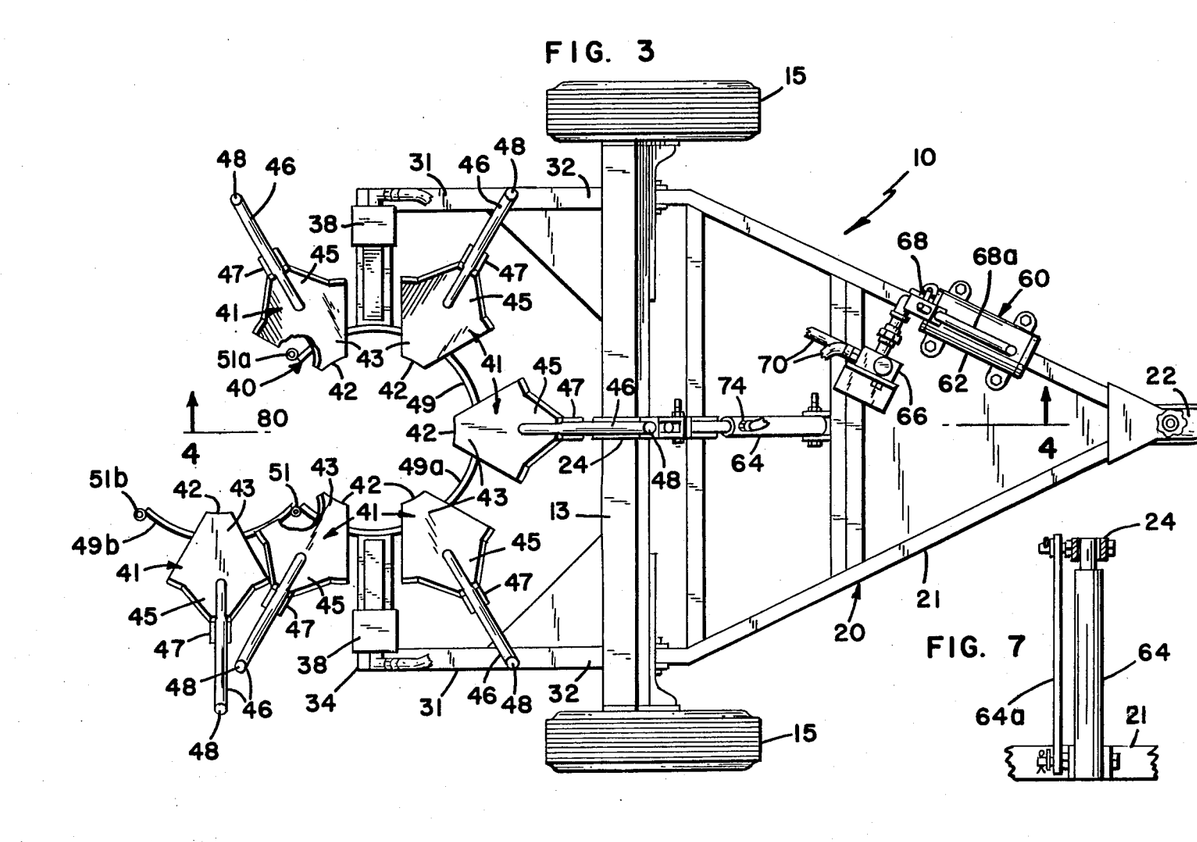

A bracket 24 provides driving connection between the first frame member 21 and the second frame member 31. More specifically, the bracket 24 is located at the forward portion 32 of the second frame member 31 and connects the forward portion 32 to a hydraulic cylinder 64 mounted on the first frame member 21.

The forward portion 22 of first frame member 21 and the rear portion 32 of second frame member 31 may each be independently supported on an axle 13 which is positioned between and joining a pair of wheels 15. The second frame member 31 is thus pivotally supported with respect to the first frame member 21 at the axle 13. The point 14 at which the second frame member 31 pivots with respect to the first frame member 21 is immediately above and adjacent to the axis of rotation 16 of the wheels 15. The positioning of frame member 21 with respect to frame member 31 may be adjusted by hydraulic 64 through the bracket 24.

The rear portion 34 of the second frame member 31 includes a pair of spaced parallel tubular supports 36 one being located at each side of member 31. The tubular supports 36 are affixed to the rear portion 34 of the second frame member 31 and extend substantially vertically therefrom. Each tubular support 36 (FIGS. 5 and 6) has a hydraulic cylinder 37a,37b disposed therein for lifting the extractor head. The hydraulic lifting cylinders 37a,37b are connected to the hydraulic system 60 by fluid ports 72 located at the lower end of each cylinder 37a, 37b.

The extractor head 40 is carried at the rear portion 34 of the second frame member 31 between a pair of spaced parallel tubular members 38 affixed thereto and extending substantially vertically therefrom. The members 38 are closed at one end and telescopingly engage the tubular supports 36. The members 38 and extractor head 40 are supported on the tubular supports 36 so that when the hydraulic system 60 is actuated, the hydraulic lifting cylinders 37a,37b within the tubular members 36 and move in a manner which raises the members 38 and extractor head 40. Reversal of the flow within the hydraulic system 60 correspondingly lowers the hydraulic lifting cylinders 37a,37b members 38 and extractor head 40 under the action of gravity.

The extractor head 40 (FIGS. 1-3) includes a plurality of blades 41. The blades 41 are reciprocally mounted in a support ring 49. The support ring 49 includes a first portion 49a which is mounted to the second frame member 31 and a second portion 49b which is hingedly attached at 51 to the first portion 49a. Hingedly mounting the second ring portion 49b to the first ring portion 49a allows the second ring portion 49b to swing open providing a gate as illustrated in FIG. 3, through which a tree trunk may pass.

The blades 41 (FIG. 4) are mounted in the support ring 49 by a plurality of support members 44 which extend outwardly from and above the support ring 49. The support members 44 are angled from the vertical direction such that the blades 41 are radially inwardly and downwardly directed with respect to the supporting ring 49. Preferably the support members 44 are square in order to prevent the blades 41 from rotating. Guide members 47, attached to the upper portion 45 of the blade 41, are slidably mounted on the support members 44 and fix the blades 41 in position about the support ring 49. The guides 47 assure that blade movement is along the longitudinal axis of the blades. Suitable fasteners 47a receivable through aligned holes in members 44, 47 maintains the blades 41 in their elevated transport portion of FIG. 1. This allows movement of extractor head 40 to the lowermost portion of FIG. 2 without interference from blades 41.

Figure 4:
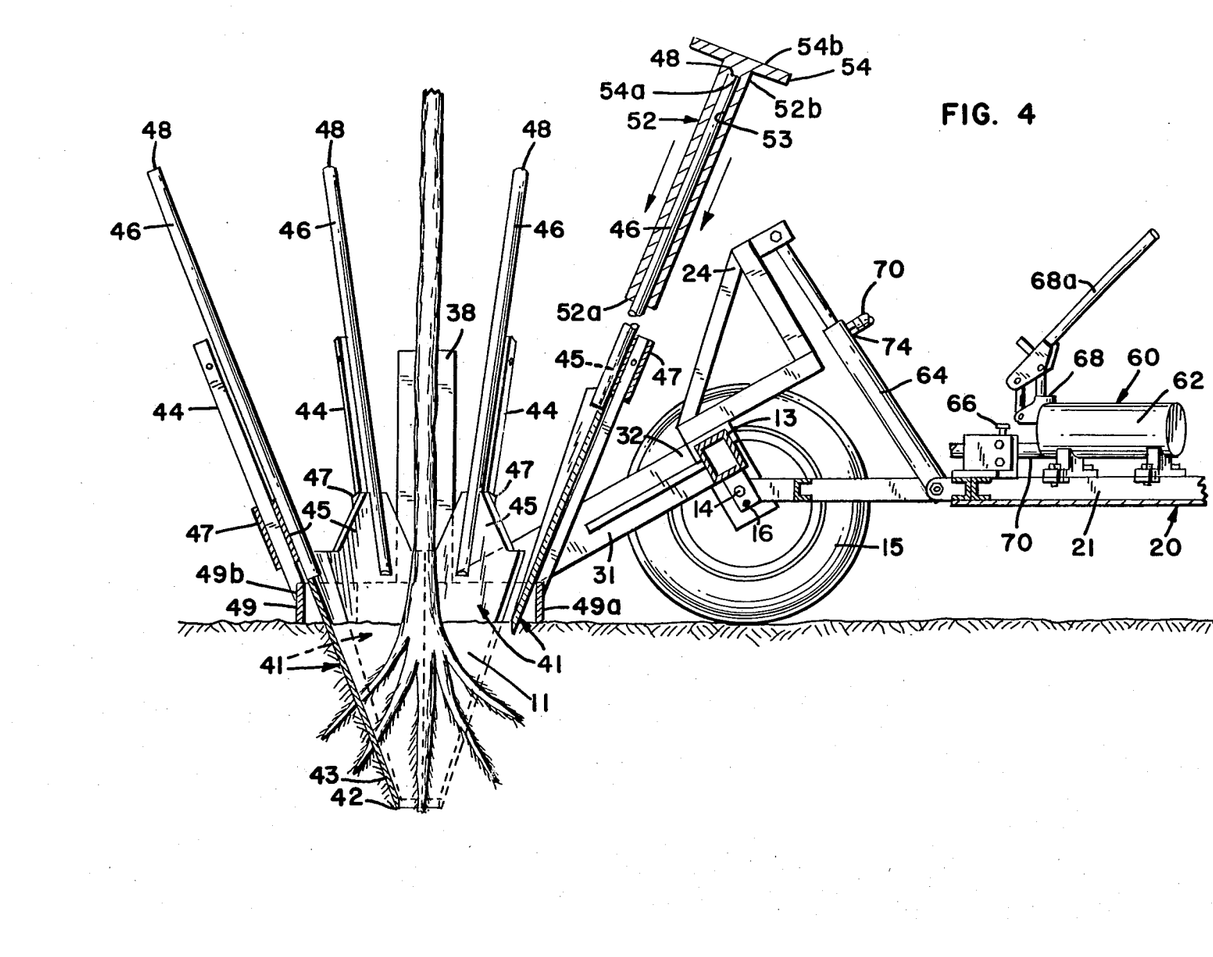
FIG. 4 is a sectional view of the back portion of the transplanter as seen from the line 4—4 of FIG. 3 with all but one extractor head blade driven into the ground.
Figure 5:
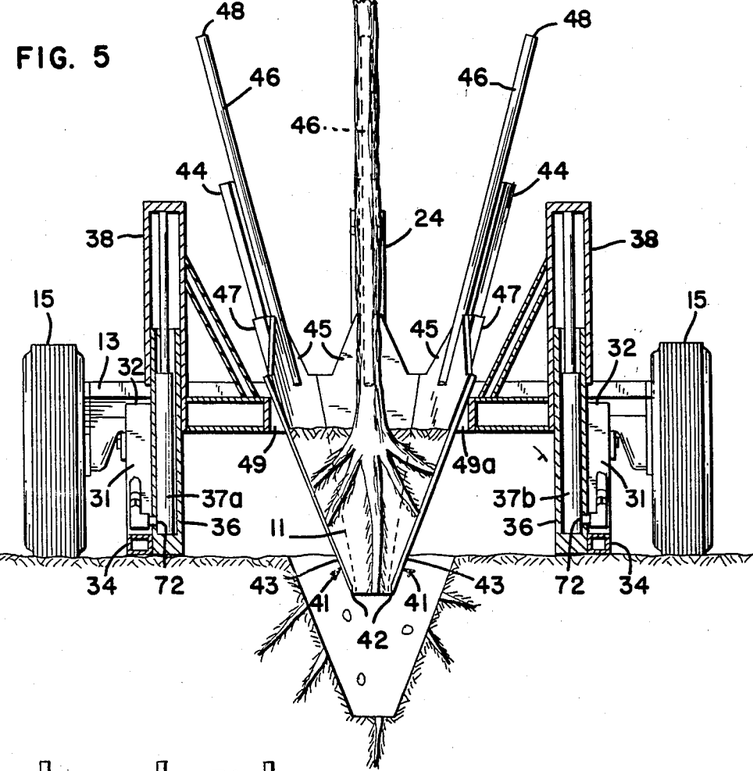
FIG. 5 is a rear sectional view of the transplanter as seen from the line 5—5 of FIG. 2 showing an extracted tree being held in the extractor head.

Each blade is generally triangular in shape and has an inner end 43 with a generally knife-like lower edge 42 to facilitate penetrating the ground surrounding the plant to be extracted. The outer end 45 of each blade includes a rod 46 attached thereto which extends in a generally outwardly direction. When all blades 41 are inserted into the ground they sever a conical mass of earth around the plant. Additionally, when totally inserted, the blades 41 form a solid walled container around the rootball 11.

With the present invention 10, manual insertion of the extractor blades 41 is facilitated by placing a rod driver 52 over the free end 48 of the rod 46. The rod driver 52 is generally cylindrical in shape and defines a cavity 53 therein. The rod driver 52 has a lower end 52a and an upper end 52b and includes a driving plate 54 at the upper end 52b. The driving plate has an interior surface 54a and an exterior surface 54b. The exterior surface 54b provides a flat surface upon which a driving force such as with a hammer can be applied and transferred to the blade being inserted into the ground. Alternatively, the driver 52 may be reciprocably slammed downwardly on the respective rod 46 with the weight of the driver 52 providing the driving force.

Figure 6:
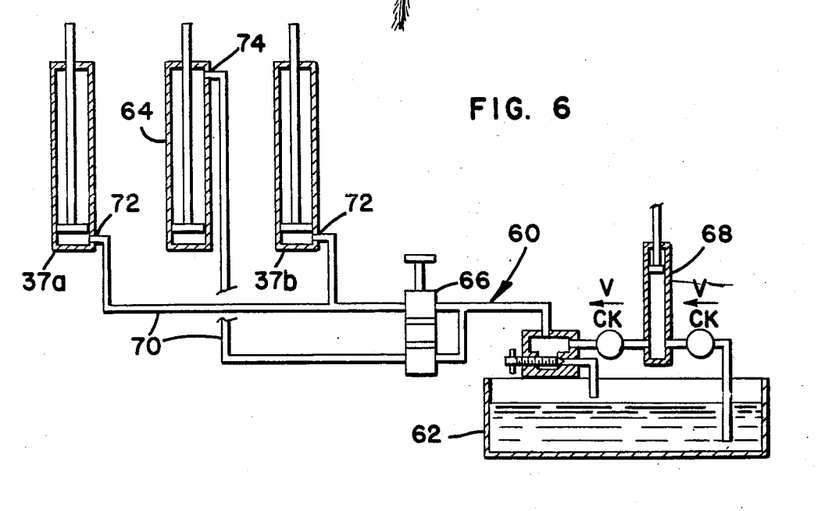
FIG. 6 is a schematic view of the fluid hydraulic system of the transplanter; and, FIG. 7 is a view of a portion of the transplanter along the line 7—7 in FIG. 1.

The hydraulic system 60 of the transplanter pivotally drives the second frame member 31 with respect to the first frame member 21. The hydraulic system 60 further acts to raise and lower the extractor head 40 with respect to the second frame member 31. FIG. 6 is a schematic of the hydraulic system employed to operate the transplanter 10. In the embodiment shown, the hydraulic system 60 includes a reservoir 62, a hydraulic cylinder 64 for driving the second frame member 31 with respect to the first frame member 21, a valve 66 the aforementioned hydraulic lifting cylinders 37a,37b and a pump 68 actuating the hydraulic system 60. The hydraulic system includes tubing 70 connecting each of the elements of the hydraulic system 60. The tubing 70 is connected to the hydraulic lifting cylinders 37a,37b at fluid ports 72 and to the hydraulic driving cylinder 64 at fluid port 74.

In the present invention the hydraulic system 60 performs two functions. First, the hydraulic system 60 acts between the first frame member 21 and second frame member 31 to pivotally drive the second frame member 31 with respect to the first frame member 21. Second, the hydraulic system further acts to raise and lower the extractor head 40 with respect to the second frame member 31. FIG. 6 schematically illustrates the hydraulic system in a position in which hydraulic lifting cylinders 37a,37b are in the lowered position corresponding to lowered extractor head 40. In FIG. 6, hydraulic driving cylinder 64 is shown in a position associated with a raised second frame member 31. The raised and lowered positions of the extractor head 40 and second frame member 31 are controlled by working handle 68a of pump 68 and valve 66. Valve 66 allows hydraulic lifting cylinders 37a,37b and hydraulic driving cylinder 64 to be raised and lowered independently.

An important feature of the present invention is that the hydraulic system 70 allows the extractor head 40 to be set at a variety of predetermined elevations above the earth surface surrounding the plant, thereby, minimizing the depth to which the blades 41 must be inserted to extract an adequate size rootball 11. The American Association of Nurseymen have established minimum rootball size standards for various plants. For example, the minimum diameter rootball for a tree grown in a nursery and having a 1¾ inch diameter trunk at the base is 22 inches in diameter. The extractor head 40 for example may be designed in size to move plants having a maximum of a 22 inch diameter ball when the extractor head rests on the surface of the ground. Raising the extractor head 2½ inches above the ground may result in extracting the necessary rootball for a 1 inch diameter tree. Further increasing the elevation of the extractor head above the ground surrounding the plant will correspondingly decrease the size of the rootball extracted. A scale 39 relating extractor head 40 height to rootball size and/or plant stem diameter may be provided for on the tubular supports 36, see FIG. 1.

In operation the transplanter 10 is positioned in the area of the plant to be transplanted. Fastener 51b on the second portion 49b of the support ring 49 is released from fastener 51a on first portion 49a by removing a pin, not shown. The second portion or gate 49b is pivoted on hinge 51 to provide access to the interior 80 of the extractor head 40. Following positioning of the extractor head 40 around the plant, the first and second portions 49a,49b of the support ring 49 are again secured by a pin inserted in fasteners 51a and 51b. The hydraulic system 60 is then actuated to lower the second frame member 31 and extractor head 40 under the action of gravity to the appropriate height for removing the plant.

With the extractor head 40 set at the appropriate height each blade 41 is inserted in the ground by applying a downwardly directed force to the rod end 48 of each blade 41. Insertion of the blades 41 is facilitated by using the rod driver 52 in the manner of a pile driver.

The cavity 53 of the rod driver 52 accommodates the rod end 48. As mentioned previously, the exterior surface 54b of the driving plate 54 provides a greater surface area if needed to which a downwardly directed driving force can be applied, thereby facilitating the insertion of the blades 41 into the ground. When all blades 41 are driven into the ground, a closed cone of soil representing the root ball 11 is contained within the support ring 49 as illustrated in FIG. 4.

When all blades are inserted into the ground about the plant, the hydraulic system 60 is actuated to raise the extractor head 40. More specifically, the hydraulic system 60 raises the hydraulic lifting cylinders 37a,37b within the tubular supports 36 thereby raising the members 38 and the extractor head 40 held between the members 38. Also, the hydraulic system 60 may be used to raise bracket 24 and in turn frame member 31 by retracting the hydraulic driving cylinder 64, thereby raising the second frame member 31.

To facilitate moving an extracted tree along highways and roads, the transplanter 10 is tilted as shown in FIG. 1 to lower the height of the tree and to distribute the weight thereof more evenly over the transplanter 10. Referring to FIG. 7, a rigid link 64a may be connected between opposite ends of cylinder 64. This provides a positive support to the frame members 21, 31 in the position of FIG. 1 during the above transport operations without relying on the components of the hydraulic system 60.

It is to be understood, however, that even though numerous advantages and characteristics of the invention have been set forth in the foregoing description, together with details of the structure and function of the invention, the disclosure is illustrative only and changes may be made in detail, especially in matters of shape and size of the parts within the principle of the invention, to the extent indicated by the broad general meaning of the terms of which the appended claims are expressed.

I claim:

1. A self-contained towable transplanter, said transplanter comprising a frame, an extractor head supported on said frame, a hydraulic system for driving said extractor head, and a plurality of wheels supporting said frame;

said frame comprising a first member and a second member, said second member including an axle positioned between and joining a pair of said wheels, said first member being mounted on said axle, said first member including means for attaching said transplanter to a towing vehicle, said second member being pivotally supported with respect to said first member at said axle, said second member carrying said extractor head;

said extractor head including a plurality of blades, said blades being reciprocally mounted in support means, said support means including a first support portion mounted on said second frame member, said support means further including a second portion hingedly mounted to said first portion, said second portion serving as a gate through which a tree trunk may pass;

said hydraulic system including means acting between said first frame member and said axle to pivotally drive said second frame member with respect to said first frame member, said hydraulic system further including means acting to raise and lower said extractor head with respect to said second frame member.

2. A self-contained towable transplanter, said transplanter comprising a frame, an extractor head supported on said frame, a hydraulic system for driving said extractor head and a plurality of wheels supporting said frame;

said frame comprisng a first member and a second member, said first member being mounted on said wheels, said first member including means for attaching said transplanter to a towing vehicle, said second member being pivotally supported with respect to said first member, said second member carrying said extractor head;

said extractor head including a plurality of blades, said blades being reciprocally mounted in support means, said support means including a first support portion mounted on said second frame member, said support means further including a second portion hingedly mounted to said first portion, said second portion serving as a gate through which a tree trunk may pass;

said hydraulic system including means acting between said first frame member and said second frame member to pivotally drive said second frame member with respect to said first frame member, said hydraulic system further including means acting to raise and lower said extractor head with respect to said second frame member;

said support means comprising a support ring wherein said blades are mounted in said support ring by a plurality of support members extending outwardly from and above said support ring, said support members being angled from the vertical direction so that said blades are inwardly and downwardly directed whereby a rootball may be dug; and said blades having a lower end and an upper end, said lower end having a generally knife-like lower edge and said upper end having a rod and a guide member attached thereto, said guide member being slidably mounted to said support member, said rod extending upwardly from said upper end of said blade to a free end, said support members being angular in cross section, said guides corresponding to the shape of said support members whereby said blades are kept aligned relative to said support ring.

3. A towable transplanter in accordance with claim 1 wherein said hydraulic system includes means for raising and lowering said extractor head to selected elevations above the ground surrounding the plant so that the size of the rootball dug by said blades varies with the height of said extractor head above the ground so that as said extractor head is positioned higher above the ground the radius and depth of the rootball dug by said blades become smaller and shallower, respectively.

4. A towable transplanter in accordance with claim 1 further comprising a rod driver, said rod driver having an open lower end, an upper end, and a cavity therein, said upper end including a flat driving plate attached thereto and perpendicular to said rod driver, said plate having interior and exterior surfaces, said rod driver being slidably mountable about said rod such that said interior surface abuts said free upper end, whereby the application of a force to said exterior surface of said plate drives said blade in a downwardly direction.

5. A towable transplanter in accordance with claim 1 wherein said hydraulic system is self contained and includes means for actuating said pivotal drive for raising and lowering said extractor head with respect to said second frame member.

6. A self-contained towable transplanter, said transplanter comprising a frame, an extractor head supported on said frame, a hydraulic system for driving said extractor head, and a plurality of wheels supporting said frame;

said frame comprising a first member and a second member, said first member being mounted on said wheels, said first member including means for attaching said transplanter to a towing vehicle, said second member being pivotally supported with respect to said first member and having a rear portion and a forward position, said rear portion including a pair of spaced parallel tubular supports affixed to said second member and extending therefrom so that when said second member is pivoted to the lowered rootball extracting position said supports are substantially orthogonal to the ground, said supports having hydraulic cylinders disposed therein for lifting said extractor head, said extractor head being carried at said rear portion between a pair of spaced parallel tubular members affixed thereto, said members overlapping and slidably engaging said tubular supports so that said extractor head can be raised and lowered with said hydraulic lifting cylinders;

said extractor head including a plurality of blades, said blades being reciprocally mounted in support means, said support means including a first support portion mounted on said second frame member, said support means further including a second portion hingedly mounted to said first portion, said second portion serving as a gate through which a tree trunk may pass; and said hydraulic system including means acting between said first frame member and said forward portion of said second frame member for pivotally driving said second frame member with respect to said first frame member, said hydraulic system further including means for driving said hydraulic cylinders to raise and lower said extractor head with respect to said second frame member.

7. A tree transplanter in accordance with claim 6 wherein said forward portion of said second member includes an axle positioned between and joining said wheels, said axle being connected by a bracket to a hydraulic cylinder for driving said second frame member with respect to said first frame member, said hydraulic system acting to pivotally drive said second frame member with respect to said first frame member at a point immediately above and adjacent to the axis of rotation of said wheels, said hydraulic driving cylinder raising and lowering said second member.

8. A towable transplanter in accordance with claim 7 wherein said support means comprise a support ring and wherein said blades are mounted in said support ring by a plurality of support members extending outwardly from and above said support ring, said support members being angled from the vertical direction such that said blades are inwardly and downwardly directed with respect to said ring.

9. A towable transplanter in accordance with claim 8 wherein each of said blades has an lower end and an upper end, said lower end having a generally knife-like lower edge and said upper end having a rod and a guide member attached thereto, said guide member being slidably mounted to said support member, said rod having one free end extending upwardly from said upper end of said blade.

10. A towable transplanter in accordance with claim 9 wherein said hydraulic system includes means for raising and lowering said extractor head to selected elevations above the ground surrounding the plant so that the size of the rootball dug by said blades varies with the height of said extractor head above said ground so that as said extractor head is positioned higher above said ground the radius and depth of the rootball dug by said blades become smaller and shallower, respectively.

11. A towable transplanter in accordance with claim 6 further comprising a rod driver, said rod driver having an open lower end, an upper end, and a cavity therein, said upper end including a flat driving plate attached thereto and perpendicular to said rod driver, said plate having interior and exterior surfaces, said rod driver being slidably mountable about said rod such that said interior surface abuts said free upper end whereby the application of a force to said exterior surface of said plate drives said blade in a downwardly direction.

12. A self-contained towable transplanter, said transplanter comprising a frame, an extractor head supported on said frame, a hydraulic system for driving said extractor head, and a plurality of wheels supporting said frame;

said frame comprising a first member and a second member, said first member being mounted on said wheels, said first member including means for attaching said transplanter to a towing vehicle, said second member being pivotally supported with respect to said first member and having a rear portion and a forward portion, said rear portion including a pair of spaced parallel tubular supports affixed to said second member an extending therefrom so that when said second member is pivoted to the lowered rootball extracting position said supports are substantially orthogonal to the ground, said supports having hydraulic cylinders disposed therein for lifting said extractor head, said extractor head being carried at said rear portion between a pair of spaced parallel tubular members affixed thereto, said members overlapping and slidably engaging said tubular supports so that said extractor head can be raised and lowered with said hydraulic lifting cylinders;

said extractor head including a plurality of blades, said blades being reciprocally mounted in support means, said support means including a first support portion mounted on said second frame member, said support means further including a second portion hingedly mounted to said first portion, said second portion serving as a gate through which a tree trunk may pass;

said hydraulic system including means acting between said first frame member and said second frame member for pivotally driving said second frame member with respect to said first frame member, said hydraulic system further including means for driving said hydraulic cylinders to raise and lower said extractor head with respect to said second frame member, said hydraulic system including a reservoir, a hydraulic cylinder for driving said second frame member with respect to said first frame member, and means for pumping fluid between said reservoir and said cylinders.

13. A towable transplanter in accordance with claim 12 wherein said forward portion of said second frame member includes means for supporting said second frame member on an axle positioned between and joining said wheels, said axle being connected by said bracket to said hydraulic driving cylinder located on and secured to said first member said hydraulic system acting to pivotally drive said second frame member with respect to said first frame member at a point immediately above and adjacent to the axis of rotation of said wheels, said hydraulic driving cylinder raising and lowering said second frame member with respect to said first frame member.

* * * * *

UNITED STATES PATENT AND TRADEMARK OFFICE
CERTIFICATE OF CORRECTION

PATENT NO. : 4,625,662

DATED : December 2, 1986

INVENTOR(S) : Ralph Heinzen

It is certified that error appears in the above-identified patent and that said Letters Patent is hereby corrected as shown below:

Column 1, lines 19-20, "necessry" should be --necessary--;

Column 2, line 47, "thereof" should be --hereof--;

Column 3, line 40, after "hydraulic" insert --cylinder--;

Column 5, line 23, "Nurseymen" should be --Nurserymen--;

Column 6, line 64, "comprisng" should be --comprising--;

Column 10, line 19, "reservior" should be --reservoir--.

Signed and Sealed this

Twenty-first Day of April, 1987

Attest:

DONALD J. QUIGG

Attesting Officer

Commissioner of Patents and Trademarks